(12) United States Patent
Lee et al.

(10) Patent No.: US 8,345,448 B2
(45) Date of Patent: Jan. 1, 2013

(54) MOBILE TERMINAL HAVING NOISE SHIELDING STRUCTURE FOR ELECTRONIC CIRCUIT BOARD

(75) Inventors: Min Ju Lee, Seoul (KR); Ji Hyung Kim, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 12/661,745

(22) Filed: Mar. 23, 2010

(65) Prior Publication Data

US 2010/0259914 A1    Oct. 14, 2010

(30) Foreign Application Priority Data

Apr. 9, 2009  (KR) .................. 10-2009-0030878

(51) Int. Cl.
*H05K 9/00* (2006.01)

(52) U.S. Cl. .................. 361/816; 361/818; 361/800

(58) Field of Classification Search .................. 361/800, 361/716, 818, 727, 756, 759, 816; 174/350, 174/377; 455/575.4, 575.1–575.3, 575.7
See application file for complete search history.

(56) References Cited

U.S. PATENT DOCUMENTS

| | | | |
|---|---|---|---|
| 6,169,665 B1 * | 1/2001 | Lepping et al. | 361/800 |
| 7,317,612 B2 * | 1/2008 | Nakanishi et al. | 361/679.27 |
| 7,831,286 B2 * | 11/2010 | Cho et al. | 455/575.4 |
| 7,969,748 B2 * | 6/2011 | Niederkorn et al. | 361/816 |
| 2008/0102908 A1 * | 5/2008 | Chen et al. | 455/575.4 |
| 2010/0273539 A1 * | 10/2010 | Lee et al. | 455/575.3 |

* cited by examiner

*Primary Examiner* — Hung S Bui (57) ABSTRACT

A mobile terminal includes a noise shielding structure for an electronic circuit board for shielding noise generated from the at least one electronic part. The mobile terminal includes a lower case and an upper case slidably moving on the lower case. The mobile station also includes an electronic circuit board installed in the lower case and having at least one electronic part mounted on its front surface. The noise shielding structure includes a front cover installed on the front surface of the electronic circuit board and formed with an opening for receiving the at least one electronic part and a sliding hinge installed between the upper case and the lower case. A shielding wall installed between the rear surface of the front cover and the front surface of the electronic circuit board and elongated around at least a part of a periphery of the opening.

20 Claims, 6 Drawing Sheets

MOBILE TERMINAL HAVING NOISE SHIELDING STRUCTURE FOR ELECTRONIC CIRCUIT BOARD

CROSS-REFERENCE TO RELATED APPLICATION(S) AND CLAIM OF PRIORITY

The present application is related to and claims priority to and the benefit of Korean Patent Application No. 10-2009-0030878 filed in the Korean Intellectual Property Office on Apr. 9, 2009, the entire contents of which are incorporated herein by reference.

TECHNICAL FIELD OF THE INVENTION

The present invention relates to a mobile terminal, and more particularly to a mobile terminal having a noise shielding structure for an electronic circuit board that effectively shields noise generated from electronic parts installed in the electronic circuit board.

BACKGROUND OF THE INVENTION

Generally, a mobile terminal is an electronic device with which a user can utilize functions such as wireless communication, network connection, and digital broadcast reception almost regardless of time and place. Recently, mobile terminals have been developed that may execute functions of Internet connection, digital broadcast reception, document writing and game playing as well as a communication function. Additionally, recent trends are towards mobile terminals that have more functions and are smaller and slimmer in accordance with users' requests.

An electronic circuit board mounted with various electronic parts is installed in a mobile terminal and is electrically connected to function modules thereof, such as a display unit and a camera unit, to output and receive various signals. However, when the mobile terminal is used, noise is generated from various electronic parts mounted on the electronic circuit board. To shield such noise, a shield can is installed on the electronic circuit board.

However, the shield can should be installed to cover the electronic parts and be separated there from by a specified distance, and requires a space above the electronic circuit board due to the thickness of the shield can. Therefore, there is a problem that the thickness of the mobile terminal is increased, and thereby the overall size of the mobile terminal is increased. Additionally, a manufacturing cost of the mobile terminal is increased due to installment of the shield can.

Accordingly, a mobile terminal having a noise shielding structure for an electronic circuit board is required that can effectively shield noise generated from electronic parts installed in the electronic circuit board and reduce the size of the mobile terminal.

SUMMARY OF THE INVENTION

To address the above-discussed deficiencies of the prior art, it is a primary object to provide a mobile terminal having a noise shielding structure for an electronic circuit board that effectively shields noise generated from electronic parts installed in the electronic circuit board and that can reduce the size of the mobile terminal.

The subject matter of the present invention is not limited to that described above, and further subject matter not described above may be understood clearly by those in the art through the following description.

In accordance with an aspect of the present invention, a mobile terminal comprising a noise shielding structure for an electronic circuit board; a lower case and an upper case slidably moving on the lower case; and an electronic circuit board installed in the lower case and including at least one electronic part mounted on its front surface, wherein the noise shielding structure configured to shield noise generated from the at least one electronic part, and wherein the noise shielding structure includes: a front cover installed on the front surface of the electronic circuit board and formed with an opening for receiving the at least one electronic part; a sliding hinge installed between the upper case and the lower case to enable the upper case to slidably move and cover the opening; and a shielding wall installed between the rear surface of the front cover and the front surface of the electronic circuit board and elongated around at least a part of a periphery of the opening.

In accordance with another aspect of the present invention, a noise shielding structure for an electronic circuit board for use in a mobile terminal, the noise shielding structure comprising: a front cover installed on a front surface of the electronic circuit board and formed with an opening for receiving the at least one electronic part; a sliding hinge installed between an upper case and the lower case of the mobile terminal to enable the upper case to slidably move and covering the opening; and a shielding wall installed between the rear surface of the front cover and the front surface of the electronic circuit board and elongated around at least a part of a periphery of the opening.

In accordance with another aspect of the present invention, a method for shielding noise for an electronic circuit board for use in a mobile terminal, the method comprising: covering a front surface of the electronic circuit board with a front cover of a noise shield structure formed with an opening for receiving the at least one electronic part; covering the opening with a sliding hindge; and shielding between a rear surface of a front cover of the noise shield structure and the front surface of the electronic circuit board and elongated around at least a part of a periphery of the opening.

Details of other exemplary embodiments are included in the detailed description and accompanying drawings.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Detailed descriptions of well-known functions and structures incorporated herein may be omitted to avoid obscuring the subject matter of the present invention.

The views in the drawings are schematic views only, and are not intended to be to scale or correctly proportioned.

The same reference numbers are used throughout the drawings to refer to the same or like parts.

A noise shielding structure for an electronic circuit board of a mobile terminal is described with reference to the drawings by exemplary embodiments of the present invention.

Although a mobile terminal according to an exemplary embodiment of the present invention is described hereinafter as a mobile communication terminal for convenience of explanation, the mobile terminal is not limited thereto. A mobile terminal according to an exemplary embodiment of the present invention is a terminal having a noise shielding structure for an electronic circuit board, and the present invention may be applied to any information communication device and multimedia device, such as a mobile communication terminal, mobile phone, personal information terminal (e.g. a Personal Digital Assistant), smart phone, IMT-2000 (International Mobile Telecommunication 2000) terminal, CDMA (Code Division Multiple Access) terminal, WCDMA (Wideband Code Division Multiple Access) terminal, GSM (Global System for Mobile Communication) terminal, GPRS (General Packet Radio Service) terminal, EDGE (Enhanced Data GSM Environment) terminal, UMTS (Universal Mobile Telecommunication Service) terminal, digital broadcasting terminal and ATM (Automated Teller Machine), and applications thereof.

Figure 1:
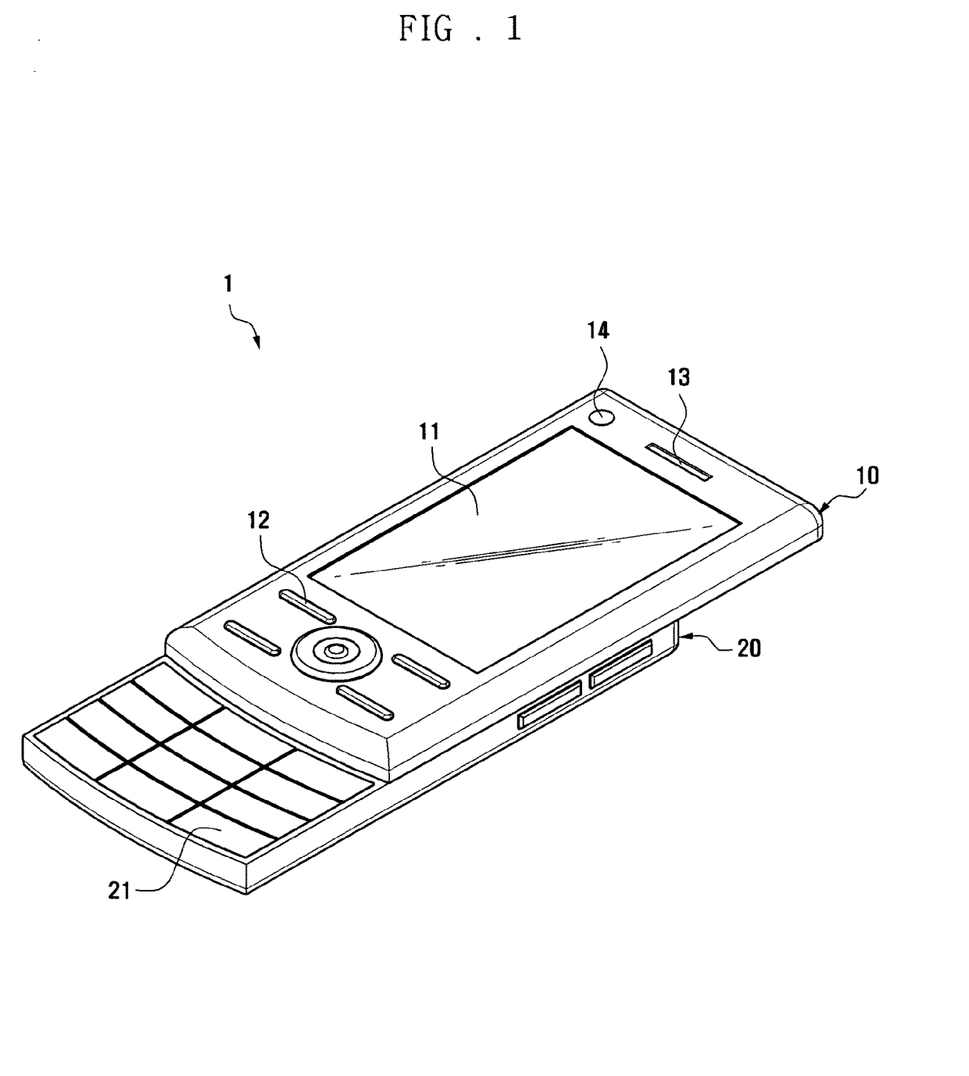
FIG. 1 illustrates an example configuration of a slide type mobile terminal.
Figure 2:
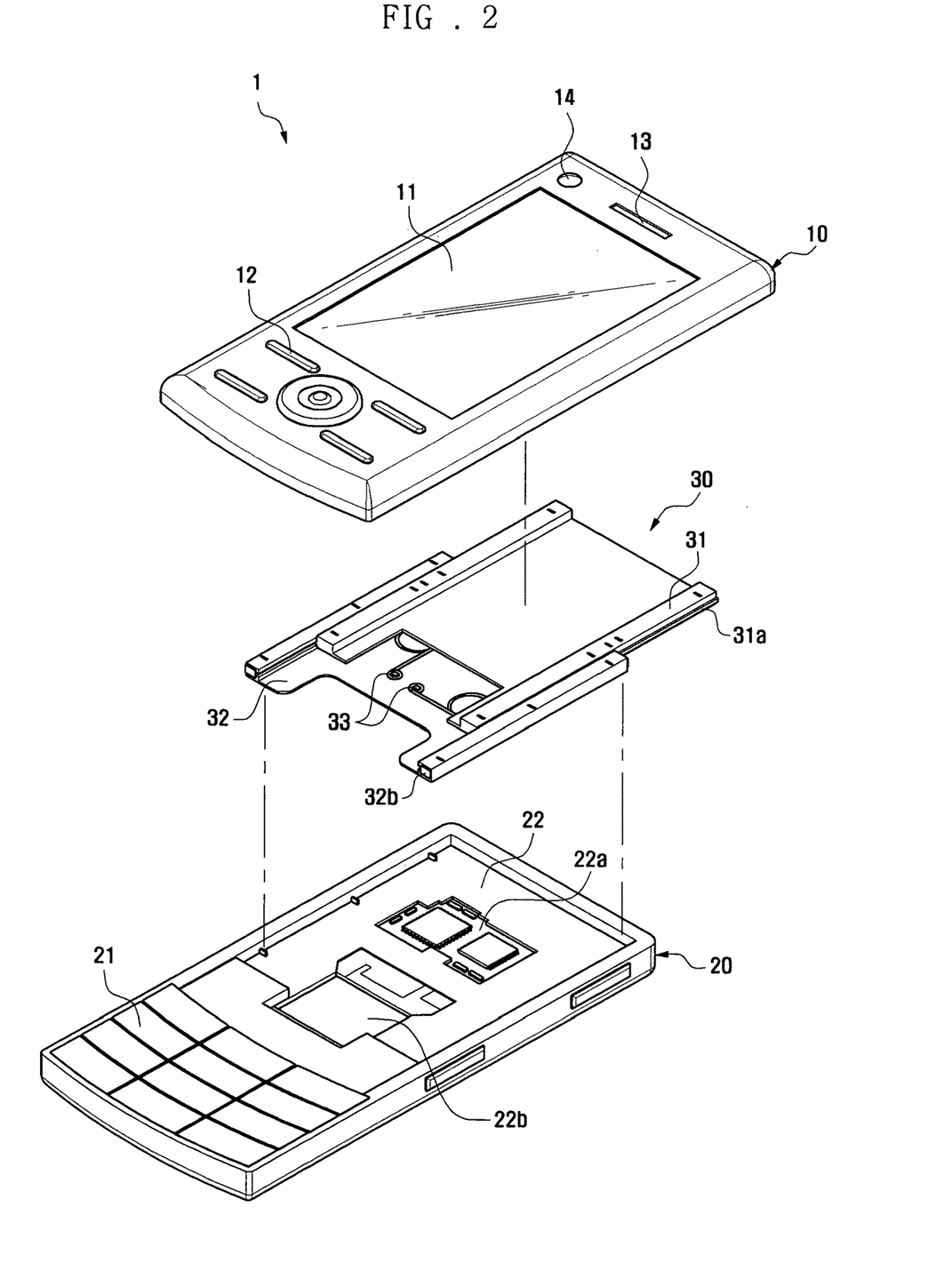
FIG. 2 illustrates an exploded perspective view of an example configuration of the slide type mobile terminal of FIG. 1.

FIG. 1 illustrates a perspective view showing an example configuration of a slide type mobile terminal, and FIG. 2 illustrates an exploded perspective view showing an example configuration of the slide type mobile terminal of FIG. 1.

As shown in FIG. 1, a slide type mobile terminal 1 includes an upper case 10 and a lower case 20. The upper case 10 includes a display unit 11, and the lower case 20 includes a key input unit 21 on a front surface thereof. The upper case 10 slidably moves in an upward and downward direction on the lower case 20.

The display unit 11 operates as a user interface through which a screen desired by a user is displayed and a command from the user is input. The display unit 11 may include an LCD (liquid crystal display) or OLED (organic light emitting diode) display.

The key input unit 21 is formed on the front surface of the lower case 20 to receive input of an operation command from the user, and is exposed outwards when the upper case 10 slidably moves in an upward direction on the lower case 20. The key input unit 21 may be embodied in a form of a key pad or key button.

In the present embodiment of the mobile terminal 1 shown in FIG. 1, an auxiliary key input unit 12 is formed on the lower front surface of the uppercase 10 adjacent to the lower front surface of the display unit 11 to receive input of an operation command from the user, however in another embodiment the display unit 11 may be formed on the entire front surface of the upper case 10. The auxiliary key input unit 12 may be formed in the lower front surface or a side surface of the upper case 10, and may include function keys such as a power supply key for switching on a power source of the mobile terminal 1 to receive input from the user, a call connection key for wirelessly connecting the mobile terminal 1 of the user to a mobile terminal of a counterparty, and a directional key for selecting menus on the display unit 11.

As shown in FIG. 1, the mobile terminal 1 includes a speaker 13 installed on the upper front surface of the upper case for outputting a sound signal, and a microphone (not shown) installed on the lower front surface of the lower case 20 for inputting a sound signal. The user may hold the speaker 13 near his ear to listen to a sound signal received from the counterparty, and hold the microphone near his mouth to send a sound signal to the counterparty. Additionally, the mobile terminal 1 includes a camera unit 14 on the upper front surface of the upper case 10 to photograph an object in front of the mobile terminal 1 and to perform visual communication.

The mobile terminal 1 includes a sliding hinge 30 between the upper case 10 and lower case 20 to guide the upper case 10 to slidably move on the lower case 20. As shown in FIG. 2, the sliding hinge 30 includes a first sliding member 31 connected to the rear surface of the upper case 10, a second sliding member 32 connected to the front surface of the lower case 20, and a hinge unit 33 installed between the first sliding member 31 and the second sliding member 32. Protrusions 31a are formed at both side surfaces of the first sliding member 31 in a movement direction of the upper case 10 to guide a slidable movement of the upper case 10, and elongated grooves 32b are provided at both side surfaces of the second sliding member 32, into which the protrusions 31a of the first sliding member 31 are inserted. The hinge unit 33 may include an elastic member such as a compression spring to slidably move the upper case 10 automatically or semi-automatically according to its position. The configuration of the sliding hinge 30 shown in FIG. 2 is exemplary only, and sliding hinge 30 is not limited thereto, and may be changed by a person having ordinary skill in the art.

Although the mobile terminal 1 described as an example in the present invention is a slide type mobile terminal, a type of a mobile terminal is not limited thereto, and the present invention may be applied to other types of a mobile terminal, such as a bar type, flip type, folder type, rotating type and combination type thereof.

Various electronic parts are installed on an electronic circuit board in the mobile terminal 1 described above, and because noise is generated from the electronic parts, a noise shielding structure is necessary for the electronic circuit board in order to shield the noise. Referring to FIGS. 3 through 6C, a noise shielding structure for an electronic circuit board according to an exemplary embodiment of the present invention is described in detail.

Figure 3:
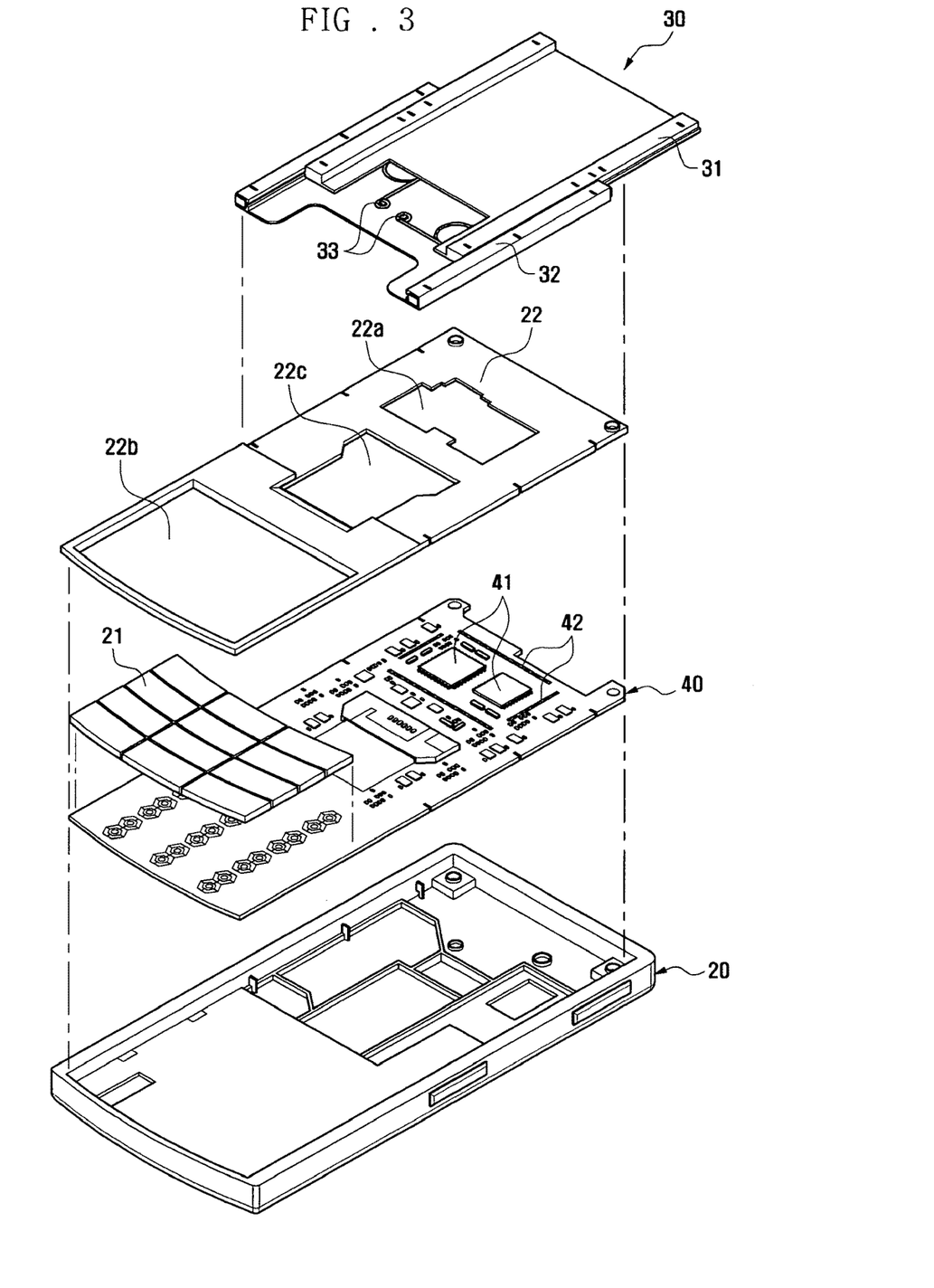
FIG. 3 illustrates an exploded perspective view of a noise shielding structure for an electronic circuit board of the slide type mobile terminal of FIG. 1 according to an exemplary embodiment of the present invention.
Figure 4:
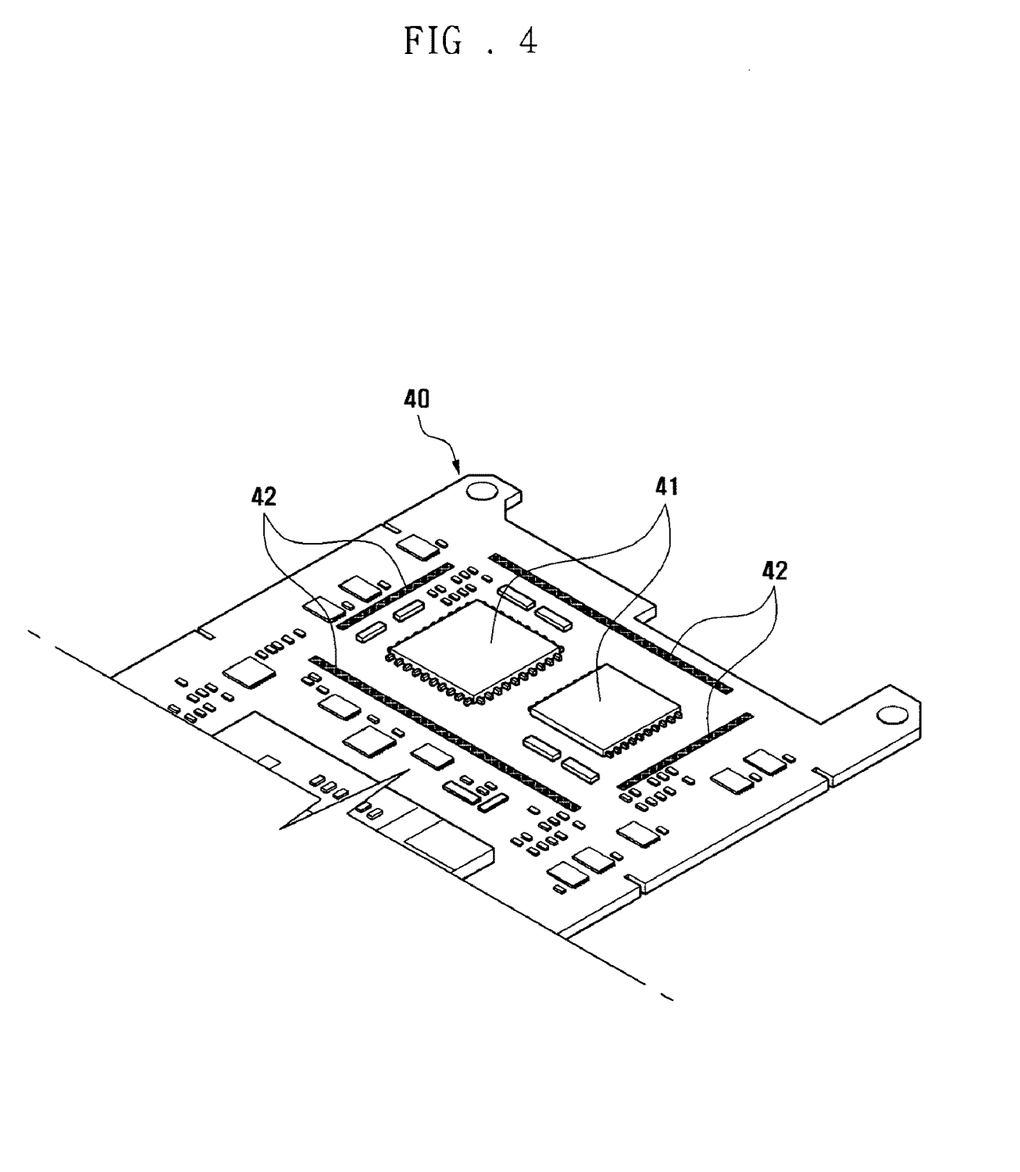
FIG. 4 illustrates a perspective view showing a front surface of the electronic circuit board in the noise shielding structure for an electronic circuit board of FIG. 3.
Figure 5:
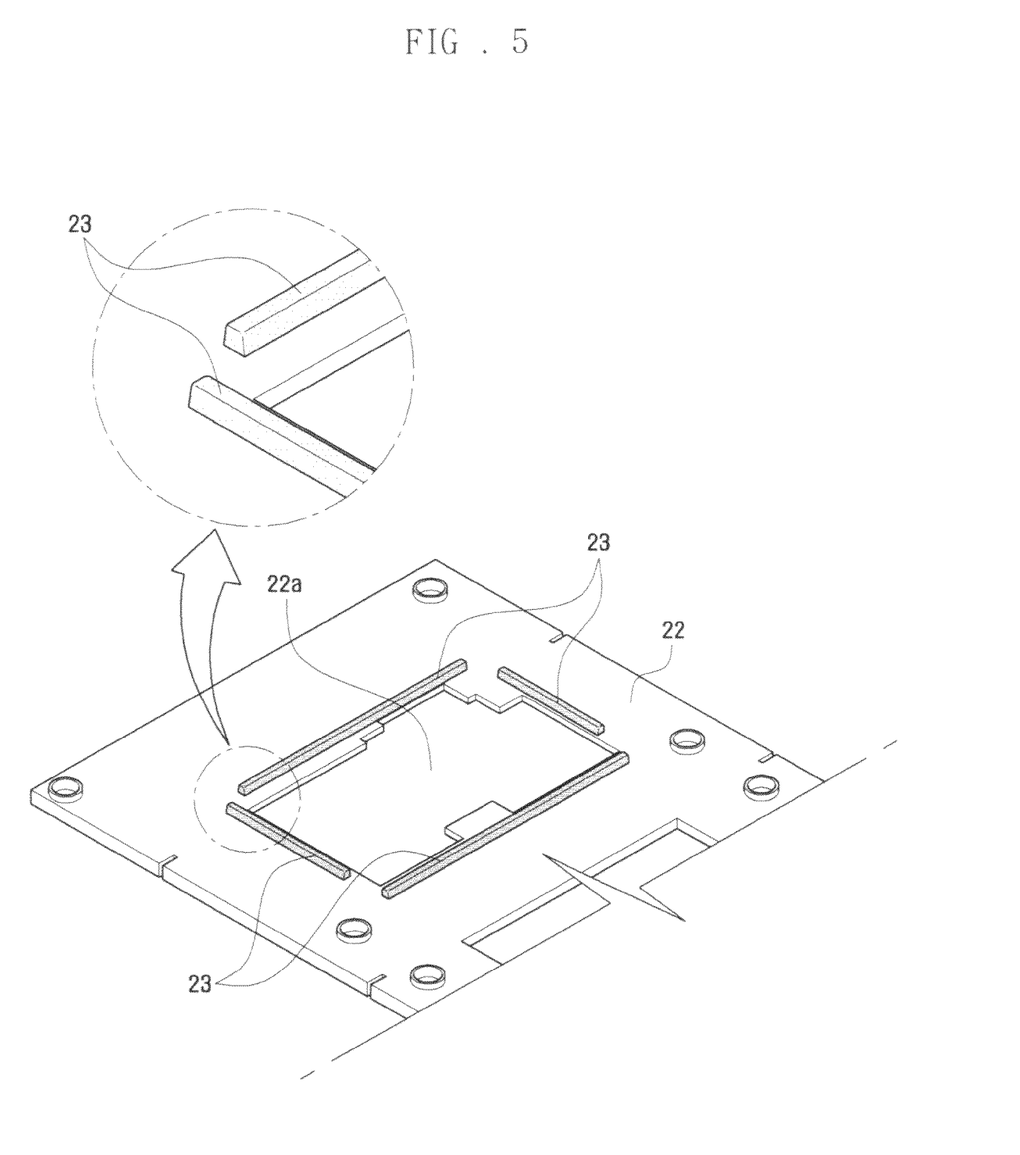
FIG. 5 illustrates a perspective view showing a rear surface of a front cover of the noise shielding structure for an electronic circuit board of FIG. 3.

FIG. 3 illustrates an exploded perspective view showing a noise shielding structure for an electronic circuit board of the mobile terminal 1 according to an exemplary embodiment of the present invention, FIG. 4 illustrates a perspective view showing a front surface of the electronic circuit board in the noise shielding structure of FIG. 3, and FIG. 5 illustrates a perspective view showing a rear surface of a front cover of the noise shielding structure of FIG. 3.

A noise shielding structure for an electronic circuit board according to an exemplary embodiment of the present invention is installed on the front surface of an electronic circuit board 40, and includes a front cover 22, the sliding hinge 30 and a shielding wall 23.

The electronic circuit board 40 is installed in the lower case 20. As shown in FIG. 3, the electronic circuit board 40 may have a thin plate shape, and includes at least one electronic part on the front surface thereof and circuit lines (not shown) connecting the at least one electronic part 41. The electronic part 41 may be a device such as a modem chip. Preferably, the electronic circuit board 40 is a printed circuit board (PCB). Various function modules such as the display unit 11 and camera unit 14 of the mobile terminal 1 are electrically connected to the electronic circuit board 40, and may be controlled by receiving electrical signals from the electronic circuit board 40. Various signals may be received and output by connecting the electronic circuit board 40 and display unit 11 and camera unit 14 using a flexible printed circuit board (FPCB) (not shown) to use an internal space of the mobile terminal 1 effectively to enable a size reduction of the mobile terminal 1.

FIG. 4 illustrates an example configuration of the electronic circuit board 40 in which two adjacent chip devices 41 are mounted on the upper surface thereof. As described later, shaded areas 42 shown in FIG. 4 are areas coated with an electrically conductive material, and may be formed at a position corresponding to a position at which the shielding wall 23 is installed.

The front cover 22 is installed on the front surface of the electronic circuit board 40 installed in the lower case 20 to cover the front surface of the lower case 20 as a cover, and may be made of a plastic material. Additionally, an opening 22a may be formed in the front cover 22 to receive at least one electronic part 41. FIG. 3 shows an example in which the opening 22a is formed to receive two adjacent chip devices 41 installed on the front surface of the electronic circuit board 40. The opening 22a is formed to penetrate the front cover 22, and a shape of the opening 22a may be variously formed according to the form and arrangement of the electronic part 41.

The sliding hinge 30 is installed between the upper case 10 and lower case 20, more precisely, on the front surface of the front cover 22 to enable sliding movement of the upper case 10, and may cover the opening 22a. The sliding hinge 30 may be made of a metal material. In the sliding hinge 30 shown in FIG. 3, the second sliding member 32 connected to the front surface of the lower case 20 covers the opening 22a, however, a form of a structure covering the opening 22a may be changed depending on a structure of the sliding hinge 30.

The shielding wall 23 is installed between the rear surface of the front cover 22 and the front surface of the electronic circuit board 40. The shielding wall 23 may be made of an electrically conductive material. As shown in FIG. 5, the shielding wall 23 is formed on the rear surface of the front cover 22, and may be elongated around a partial periphery of the opening 22a or the entire periphery of the opening 22a. As shown in FIG. 4, the area 42 of the front surface of the electronic circuit board 40 corresponding to a position of the shielding wall 23 on the rear surface of the front cover 22 may be coated with an electrically conductive material 24a. Preferably, the height of the shielding wall 23 is substantially equal to or slightly less than the height of the electronic part 41.

By using the front cover 22, sliding hinge 30 and shielding wall 23 as a noise shielding structure of the mobile terminal 1, a shield can that is installed between a conventional front cover and electronic part of a conventional mobile terminal may be omitted.

Figure 6A:
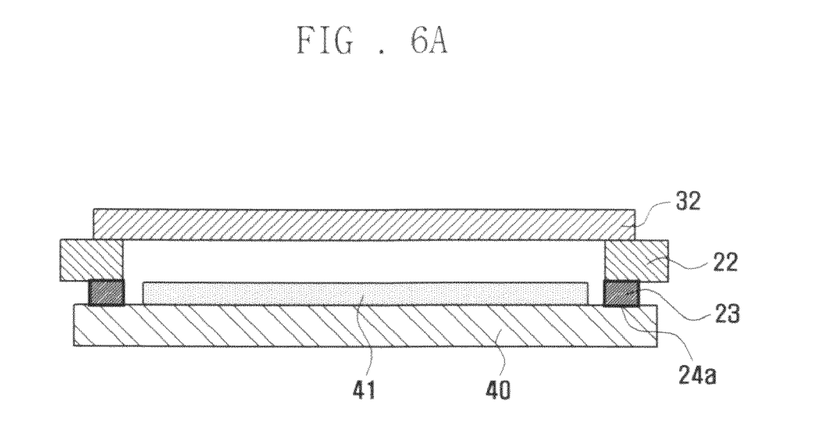
FIGS. 6A through 6C are cross-sectional views showing configurations of the noise shielding structure for an electronic circuit board of FIG. 3.
Figure 6B:
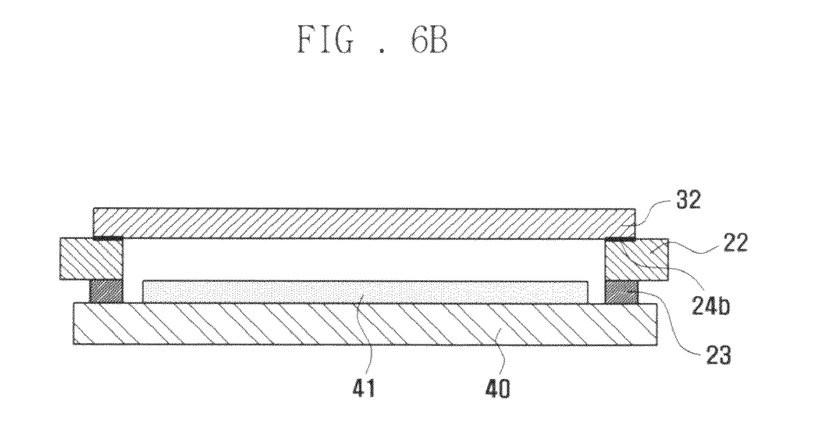
Figure 6C:
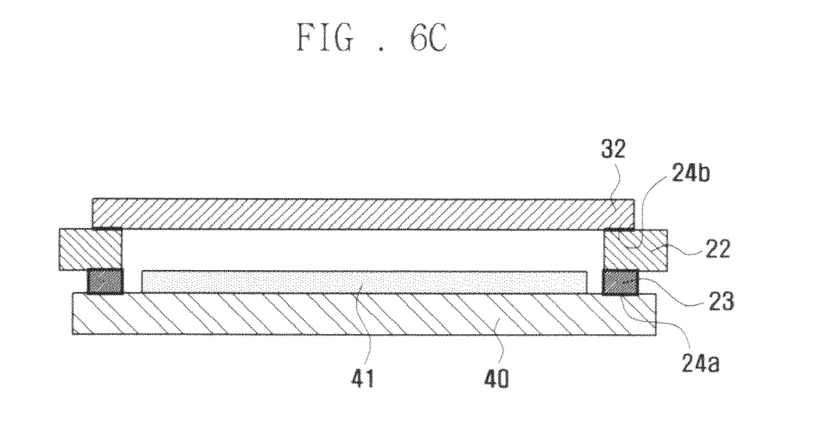

FIGS. 6A through 6C are cross-sectional views showing configurations of the noise shielding structure for an electronic circuit board of FIG. 3.

As shown in FIGS. 6A through 6C, a shield can that is installed between a conventional front cover and electronic part of a conventional mobile terminal may be omitted by installing the shielding wall 23 surrounding the electronic part 41 on the front surface of the electronic circuit board 40, forming the opening 22a in the front cover 22 of the lower case 20, and covering the opening 22a by the sliding hinge 30. Accordingly, the thickness of the mobile terminal 1 may be reduced, and the same noise shielding effect as the conventional shield can may result. The configurations of the shielding wall 23, front cover 22 and sliding hinge 30 shown in FIGS. 6A through 6C are only exemplary and are not limited thereto, and may be changed by a person having ordinary skill in the art.

In a noise shielding structure for the electronic circuit board 40 according to an exemplary embodiment of the present invention, electrically conductive materials 24a and 24b may be coated on a surface of the shielding wall 23 or on an area at which the sliding hinge 30 and the front cover 22 are joined. The electrically conductive material may be an electrically conductive paste containing electrically conductive particles including metals such as gold, silver and nickel, or carbon, and based on a resin such as an epoxy resin, urethane resin and acrylic resin. The electrically conductive materials 24a and 24b may increase a noise shielding effect by shielding a surface of the shielding wall 23 or a space between the sliding hinge 30 and front cover 22 and providing electrical conductivity.

FIG. 6A shows the electrically conductive material 24a coated on the surface of the shielding wall 23, FIG. 6B shows the electrically conductive material 24b coated on an area at which the sliding hinge 30 and front cover 22 are joined, and FIG. 6C shows the electrically conductive materials 24a and 24b coated on the surface of the shielding wall 23 and on an area at which the sliding hinge 30 and the front cover 22 are joined, respectively. A position at which the electrically conductive material 24b is coated at the area in which the sliding hinge 30 and the front cover 22 are joined in FIGS. 6B and 6C may correspond to a position at which the shielding wall 23 is installed, as shown in a dotted area of FIG. 4. However, the position at which the electrically conductive material is coated in the sliding hinge 30 is not limited thereto, and the electrically conductive material may be coated at an entire area at which the sliding hinge 30 covers the opening 22a.

The same noise shielding effect as that of a conventional shield can may be provided by coating the electrically conductive materials 24a and 24b on the surface of the shielding wall 23 surrounding the electronic parts 41 and the area at which the sliding hinge 30 and the front cover 22 are joined, as described above.

As described above, in the noise shielding structure for an electronic circuit board according to an exemplary embodiment of the present invention, noise generated from the electronic parts 41 on the electronic circuit board 40 may be effectively shielded by using the front cover 22, sliding hinge 30 and shielding wall 23 without using a shield can as in the prior art. Additionally, because a conventional shield can is not used, the thickness of the mobile terminal 1 may be reduced, thereby simplifying an overall configuration of the mobile terminal 1. Additionally, because the conventional shield can is not used, a manufacturing cost of the mobile terminal 1 may be reduced. Specific embodiments of the present invention are shown in drawings and are described herein in detail, with the understanding that the present disclosure is to be considered as an exemplification of the principles of the invention and is not intended to limit the invention to the specific embodiments illustrated.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal comprising:
   a noise shielding structure for an electronic circuit board;
   a lower case and an upper case configured to be slidably movable on the lower case; and
   an electronic circuit board installed in the lower case and including at least one electronic part mounted on its front surface,
   wherein the noise shielding structure is configured to shield noise generated from the at least one electronic part, and wherein the noise shielding structure comprises:
   a front cover installed on the front surface of the electronic circuit board and formed with an opening for receiving the at least one electronic part;
   a sliding hinge installed between the upper case and the lower case to enable the upper case to slidably move and cover the opening; and
   a shielding wall installed between the rear surface of the front cover and the front surface of the electronic circuit board and elongated around at least a part of a periphery of the opening.

2. The mobile terminal of claim 1, wherein at least one of the surface of the shielding wall and an area at which the sliding hinge and the front cover are joined is coated with an electrically conductive material.

3. The mobile terminal of claim 1, wherein the front cover is made of a plastic material.

4. The mobile terminal of claim 1, wherein the sliding hinge is made of a metal.

5. The mobile terminal of claim 1, wherein the shielding wall is made of an electrically conductive material.

6. A noise shielding structure for an electronic circuit board for use in a mobile terminal, the noise shielding structure comprising:
   a front cover installed on a front surface of the electronic circuit board and formed with an opening for receiving at least one electronic part;
   a sliding hinge installed between an upper case and a lower case of the mobile terminal to enable the upper case to slidably move and cover the opening; and
   a shielding wall installed between a rear surface of the front cover and the front surface of the electronic circuit board and elongated around at least a part of a periphery of the opening.

7. The noise shielding structure of claim 6, wherein the upper case slidably moves on the lower case, and wherein the electronic circuit board is installed in the lower case and comprises the at least one electronic part mounted on its front surface.

8. The noise shielding structure of claim 6, wherein the noise shielding structure is configured to shield noise generated from the at least one electronic part.

9. The noise shielding structure of claim 6, wherein at least one of the surface of the shielding wall and an area at which the sliding hinge and the front cover are joined is coated with an electrically conductive material.

10. The noise shielding structure of claim 6, wherein the front cover is made of a plastic material.

11. The noise shielding structure of claim 6, wherein the sliding hinge is made of a metal.

12. The noise shielding structure of claim 6, wherein the shielding wall is made of an electrically conductive material.

13. A method for shielding noise for an electronic circuit board for use in a mobile terminal, the method comprising:
    providing a front surface of the electronic circuit board with a front cover of a noise shield structure formed with an opening for receiving at least one electronic part;
    shielding noise with a sliding hinge configured to cover the opening; and
    shielding noise with a shielding wall positioned between a rear surface of the front cover of the noise shield structure and the front surface of the electronic circuit board and elongated around at least a part of a periphery of the opening.

14. The method of claim 13, wherein the mobile terminal includes a lower case and an upper case configured to be slidably movable on the lower case, and wherein the electronic circuit board is installed in the lower case and comprises the at least one electronic part mounted on its front surface.

15. The method of claim 13, wherein shielding noise comprises shielding noise generated from the at least one electronic part.

16. The method of claim 14, wherein the sliding hinge is installed between the upper case and the lower case to enable the upper case to slidably move and cover the opening.

17. The method of claim 13, wherein at least one of a surface of the shielding wall and an area at which the sliding hinge and the front cover are joined is coated with an electrically conductive material.

18. The method of claim 13, wherein the front cover is made of a plastic material.

19. The method of claim 13, wherein the sliding hinge is made of a metal.

20. The method of claim 13, wherein the shielding wall is made of an electrically conductive material.

* * * * *